United States Patent
Bucher et al.

(10) Patent No.: US 9,416,331 B2
(45) Date of Patent: Aug. 16, 2016

(54) DRAG REDUCING COMPOSITIONS AND METHODS OF MANUFACTURE AND USE

(75) Inventors: Brad A. Bucher, Houston, TX (US); Tom M. Weatherford, Magnolia, TX (US)

(73) Assignee: Flowchem, Ltd., Waller, TX (US)

( * ) Notice: Subject to any disclaimer, the term of this patent is extended or adjusted under 35 U.S.C. 154(b) by 497 days.

(21) Appl. No.: 13/817,564

(22) PCT Filed: Aug. 23, 2011

(86) PCT No.: PCT/US2011/048807
§ 371 (c)(1),
(2), (4) Date: Aug. 28, 2013

(87) PCT Pub. No.: WO2012/027367
PCT Pub. Date: Mar. 1, 2012

(65) Prior Publication Data
US 2014/0039229 A1    Feb. 6, 2014

Related U.S. Application Data

(60) Provisional application No. 61/376,146, filed on Aug. 23, 2010.

(51) Int. Cl.
*B01F 3/12*    (2006.01)
*B01F 17/18*   (2006.01)
*B01F 17/52*   (2006.01)
*C10M 157/04*  (2006.01)
*C08L 23/02*   (2006.01)
*C08L 91/06*   (2006.01)

(52) U.S. Cl.
CPC .............. *C10M 157/04* (2013.01); *C08L 23/02* (2013.01); *C08L 91/06* (2013.01)

(58) Field of Classification Search
CPC ......... C08L 23/02; C08L 33/02; C08L 91/06; C08L 33/04; C10M 157/04
USPC .................... 523/13, 237; 508/110, 470, 519; 585/1–4, 14
See application file for complete search history.

(56) References Cited

U.S. PATENT DOCUMENTS

| | | | | |
|---|---|---|---|---|
| 7,468,402 B2 * | 12/2008 | Yang et al. | | 523/175 |
| 2001/0049402 A1 * | 12/2001 | Foster | | 523/122 |
| 2008/0047614 A1 * | 2/2008 | Hammonds et al. | | 137/237 |
| 2008/0139696 A1 * | 6/2008 | Bucher et al. | | 523/175 |
| 2009/0227729 A1 | 9/2009 | Burden | | |

FOREIGN PATENT DOCUMENTS

| | | | |
|---|---|---|---|
| CA | 2829901 A1 * | 4/2010 | |
| WO | WO 9847937 A1 * | 10/1998 | |
| WO | WO 03076482 A1 * | 9/2003 | |

* cited by examiner

*Primary Examiner* — Pamela H Weiss
(74) *Attorney, Agent, or Firm* — Bushman Werner, P.C.

(57) ABSTRACT

A drag reducing composition and method of use wherein the drag reducing composition comprises a polyolefin, drag reducing polymer, a carrier or suspending medium, and a polycarboxylate dispersion agent.

15 Claims, No Drawings

DRAG REDUCING COMPOSITIONS AND METHODS OF MANUFACTURE AND USE

CROSS REFERENCE TO RELATED APPLICATION

This application claims priority to U.S. Patent Application Ser. No. 61/376,146 filed on Aug. 23, 2010, the disclosure of which is incorporated herein by reference for all purposes.

FIELD OF THE INVENTION

The present invention relates to compositions for reducing friction in the flow of hydrocarbons such as crude oil or refined products in conduits such as pipelines, and to methods for producing and using such compositions.

DESCRIPTION OF THE PRIOR ART

The prior art abounds with patents directed to generally non-crystalline, high molecular weight polyolefin, particularly polyalphaolefins, compositions which are generally hydrocarbon soluble and, when dissolved in a hydrocarbon fluid flowing through a conduit, greatly reduce turbulent flow and decrease "drag." This reduction of drag is important since it reduces the amount of horsepower needed to move a given volume of hydrocarbon, or conversely enables greater volumes of fluid to be moved with a given amount of power. These polyolefin drag reducers display flow enhancing characteristics not present in commonly known crystalline, largely non-hydrocarbon soluble polymers such as polyethylene and polypropylene. It is known that these polyalphaolefin drag reducers are susceptible to degradation by shear when dissolved in the flowing hydrocarbon in the conduit. Accordingly, pumps, constrictions in the conduit or the like which result in excessive turbulent flow lead to degradation of the polymer thereby decreasing its effectiveness. Accordingly, it is necessary that the drag reducing compositions be introduced into the flowing hydrocarbon stream in a form which achieves certain desirable features.

First of all, the drag reducing compositions should be in a form that is easy to transport and handle without special equipment since injection points for the drag reducing compositions into the flowing hydrocarbon stream are often at remote and inaccessible locations. Secondly, the polymer must be in a form which dissolves rapidly in the hydrocarbon stream flowing in the conduit since the polyalphaolefins have little drag reducing effect until solubilized in the hydrocarbon stream. The drag reducing composition should impart no deleterious effects to the hydrocarbon. For example, in the case of crude oil flowing through a pipeline, certain amounts of material and contaminants can be tolerated unlike in finished pipeline products such as diesel fuel, gasoline and other hydrocarbon materials resulting from refining operations. Furthermore, since the drag reducing compositions are often used in climates where storage facilities for the drag reducing composition can reach temperatures of greater than 125° F., it is necessary that the drag reducing compositions exhibit heat stability in the sense that the polymer particles do not agglomerate, thereby creating problems in injection of the drag reducing composition into flowing hydrocarbon streams. It is also desirable that the drag reducing compositions contain a high loading of the polymer and be stable; i.e., remain, to the extent possible, as stable dispersions, even though being quiescent for extended periods of time; e.g., in storage. Desirably, the drag reducing composition should exhibit minimum foaming if the need arises for agitation. In this regard, if the drag reducing composition has settled, agitation will be necessary to redisperse the polymer particles. This agitation can result in excessive foaming necessitating the use of foam-suppressing agents.

SUMMARY OF THE INVENTION

In one aspect the present invention provides drag reducing compositions having a high loading of active polyolefin in the composition, do not agglomerate i.e., are heat stable, and are low-foaming.

In another aspect, the present invention provides a drag reducing composition comprising a polyolefin, drag-reducing polymer, a carrier or suspending medium and a dispersion agent.

In still another aspect of the present invention, there is provided a method of reducing drag in a conduit conveying a liquid hydrocarbon comprising introducing into the conduit an effective amount of a drag reducing composition described above.

DESCRIPTION OF THE PREFERRED EMBODIMENTS

Polymers which are used to prepare the finely divided polymer particles used in the drag reducing compositions of the present invention are obtained by polymerizing or copolymerizing mono-olefins containing from about 2 to about 30 carbon atoms. More usually, the mono-olefins, which are preferably alpha olefins, used in the preparation of the friction-reducing polymers used in the drag reducing compositions of the present invention contain from about 4 to about 20 carbon atoms, most preferably from about 6 to about 14 carbon atoms.

Any of several well known methods for polymerizing the mono-olefins may be employed to produce the polymeric/copolymeric friction-reducing agents used in the drag reducing compositions of the present invention. A particularly suitable method is the Ziegler-Natte process which employs a catalyst system comprising the combination of a compound of a metal of Groups IVb, Vb, VIb, or VIII of the Periodic Chart of Elements, with an organo metal compound of a rare earth metal or a metal from Groups Ia, IIa, and IIIb of the Periodic Chart of the Elements. Particularly suitable catalyst systems are those comprising titanium halides and organo aluminum compounds. A typical polymerization procedure is to contact the monomeric mixture with a catalyst in a suitable inert hydrocarbon solvent for the monomers and the catalyst in a closed reaction vessel at reduced temperatures autogenous pressure and in a nitrogen or inert atmosphere. Methods and catalysts used in the preparation of polyolefin drag-reducing polymers useful in the present invention are disclosed in the following U.S. Pat. Nos. 4,289,679; 4,358,572; 4,415,704; 4,433,123; 4,493,903; and 4,493,904, all of which are incorporated herein by reference for all purposes. Polyalphaolefins used in the drag reducing compositions of the present invention can be produced by a so-called solution polymerization technique, or by bulk polymerization methods as described, for example, in U.S. Pat. No. 5,539,044, the disclosure of which is incorporated herein by reference for all purposes.

The polymers which are used in preparing the drag reducing compositions of the present invention are generally those of high molecular weight, the only limitation on the molecular weight being that it must be sufficient to provide effective friction reduction in the flowing stream of hydrocarbon in a conduit. In general, the effectiveness of the polymer composition to reduce friction increases as the molecular weight increases. On the upper end of the scale, the molecular weight of the polymers used in the process of the invention is limited only by the practicability of making the polymers. The average molecular weight of the desirable polymers is usually over 100,000 and is generally in the range of from about 100,000 to about 30 million. The average molecular weight of the polymers used in the processes and compositions of the present invention is preferably in the range of about 10 to about 25 million. In general, useful polyolefins in the present invention can be characterized as ultra-high molecular weight non-crystalline polymers.

Generally speaking, the drag reducing compositions of the present invention will contain from about 10 to 45%, preferably 30 to 41% by weight of the polyolefin produced as described above, be it a solution or bulk polymerized polymer. Unless otherwise specified, all percentages herein are by weight and refer to the weight of the drag reducing compositions.

In addition to the polyolefin friction reducing agent, the drag reducing compositions of the present invention can contain a coating or partitioning agent, e.g., a wax. The term "wax" includes any low melting, e.g., <500° C., organic mixture or compound of high molecular weight which is solid at ambient temperature. The waxes contemplated by the present invention can be natural, i.e., derived from animal, vegetable or mineral sources, e.g., fatty acid waxes, or synthetic as, for example, ethylenic polymers, waxes obtained from the Fischer-Tropsch synthesis, etc. Non-limiting examples of suitable waxes include paraffin, micro-crystalline wax, slack or scale wax, polymethylene wax, polyethylene wax, fatty acid wax, etc. Typically, the waxes used in the compositions of the present invention are hydrocarbon in nature and are powders or particulates at room temperature. In addition to waxes, non-limiting examples of other suitable coating agents include talc, alumina, metal salts of a fatty acid, e.g, metal stearates, silica gel, polyanhydride polymers, etc. It will be understood that the term "coating agent" is intended to and does include components which while not actually coating the polymeric friction reducing agent, interact with the polymeric reducing agents in such a way, be it chemical or physical, which prevents the polyolefin, when ground to a desired particle size, from agglomerating to the extent that the agglomerated material constitutes a solid or substantially solid non-dispersable mass.

Generally speaking and when used, the coating or partitioning agent will be present in the compositions of the present invention in an amount of from about 0.1 to about 25% by weight, preferably from about 5 to about 10% by weight.

The drag reducing compositions of the present invention employ a polymeric dispersion agent, which stabilizes the polymeric particles from agglomeration and concomitant settling. The polymeric dispersion agents of the present invention can be generically described as polycarboxylate-type materials. These polymeric molecules comprise repeating units of a carbon-based backbone, some or all of the repeating units having a carboxylic acid group. The carboxylic acid groups can be neutralized to form the salts or neutralized with another base to form other salts; e.g., sodium salts, ammonium salts, etc. The acid groups can also be reacted with other materials; e·g., alcohols, anhydrides, etc., to form esters, etc. In addition, various co-monomers can be employed to alter the character and composition of the resulting polymer.

A preferred group of polycarboxylate dispersion agents according to the present invention are those having the general formula:

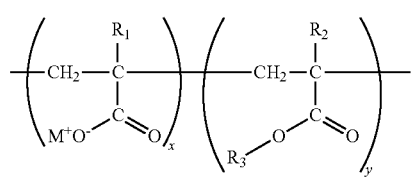

Formula 1 wherein $R_1$ and $R_2$ are independently $H^+$ or methyl, wherein $R_3$ is an alkyl group having from 1 to 3 carbon atoms, wherein x and y are integers which can be the same or different, the sum of x and y being from 10 to 700, and wherein $M^+$ is a cation.

As can be seen from the above formula, the polycarboxylate-type materials can be copolymers (block or random) of acrylic acid and various alkyl acrylic acids, e.g., methacrylic acid and can have ester groupings as well as acid groupings.

In a preferred embodiment, $R_1$ and $R_2$ are hydrogen, $R_3$ is a methyl group, the sum of x and y is from 70 to 200 and M is an ammonium ion.

The carboxylate-type polymers useful in the present invention have been found to be exceptionally effective in structuring and stabilizing the aqueous dispersions of polyolefins. In particular, certain of these materials exhibit unexpected and unusual capacity to stabilize water-based formulations containing polyolefins, such formulations exhibiting stability over a wide temperature range.

Non-limiting examples of specific polymeric dispersion agents are marketed under the trademark HYDROPALAT® by Cognis Deutschland GmbH. In particular, it has been found that HYDROPALAT® 100 and HYDROPALAT® 34 dispersion agents are particularly useful. The latter are described as hydrophobic ammonium co-polymers, or hydrophobically modified acrylic acid polymers. These compounds have a pH of from about 6 to 7.

The polymeric dispersion agents of the present invention will be present in the drag reducing compositions in an amount effective to render the composition a substantially uniform dispersion. More particularly, they will be present in an amount of from about 0.1 to about 5% by weight, more preferably from about 0.2 to about 3% by weight.

Drag reducing compositions that exhibit foaming are undesirable because the formulations are agitated during storage to maintain homogeneity, and foam generation can cause problems related to pumping the formulation for its intended use, can interfere with the agitation process itself, and can create product overflow from storage. To prevent these problems, an anti-foam agent can be added to the formulation, or the surfactant can be replaced by a low-foaming surfactant that produces less foam: both of which options add cost to the formulation.

The drag reducing compositions of the present invention do not require the use of anti-foam agents. The compositions are therefore easier to agitate by a variety of methods, e.g., high-speed blending, nitrogen-sparging, etc., as needed upon storage without any significant foaming. The compositions of the present invention are therefore easier and less expensive to prepare, due to fewer ingredients, and to store and handle, e.g. pump, due to a reduced concern related to foam generation. In addition, although alcohol(s) are sometimes added to drag reducing compositions to facilitate use under low-temperature conditions and to reduce foaming, their use is only required when low-temperature use is a factor.

The terms "carrier" or "suspending medium" mean a liquid, primarily aqueous in nature, in which the polymeric component is insoluble but which can contain water soluble compounds such as alcohols, glycols, etc.

In addition to the above components, the drag reducing composition of the present invention can also contain up to about 40 wt. % of an alcohol as a freeze point depressant. Suitable non-limiting examples of alcohols include alcohols and glycols containing from 1 to 14 carbon atoms, preferably from about 1 to about 8 carbon atoms. Specific, non-limiting examples of such alcohols and glycols include methanol, ethanol, propyl alcohols, butyl alcohols, hexyl alcohols, ethylene glycol, propylene glycol, triethylene glycol, glycerol, etc., as well as alcohols and glycols which contain ether linkages. It is desirable that the alcohols whether mono alcohols or polyhydric alcohols be miscible with the water as well as the surfactants employed. The use of an alcohol in the compositions is only necessary when the compositions may be used in low temperature environments where they can act as freeze point depressants so as to maintain the compositions fluid at such low temperature conditions. When employed, the alcohols will be present in an amount of from 0 up to about 20 wt. % of the composition.

The composition of the present invention can also include, with advantage, thickening agents, non-limiting examples of which include guar gum, guar gum derivatives, hydroxy methyl cellulose, xanthan gums, polyacrylamides, hydroxy propyl cellulose, modified starches, and polysaccharides. When employed, the thickening agents will generally be present in an amount of from about 0.01 to about 1.0 wt. %, preferably from about 0.25 to about 0.5 wt. %. A particularly desirable thickening agent is an anionic polysaccharide marketed under the name Welan Gum by C.P. Kelco.

The compositions of the present invention can also include, with advantage, a biocide in an amount of from about 0.01 to about 0.5 wt. %, preferably from about 0.05 to about 0.3 wt. %. Non-limiting examples of typical biocides include: glutaraldehyde, a glutaraldehydelquaternary ammonium compound blend, isothiazolin, tetrakishydromethyl phosphonium sulfate (THPS), 2,2-dibromo-3-nitrilopropionamide, bronopol and mixtures thereof.

In one method of preparing the compositions of the present invention, the drag reducing polymeric agent is ground at cyrogenic temperatures to produce a, finely divided free flowing particulate polyolefin material. The term "cryogenic temperatures" means temperatures below the glass transition temperature of the polymer or copolymers which are being subjected to grinding. For example, when the polyolefin friction-reducing agent is a high molecular weight polymer (1. decene), the cyrogenic temperature is below about −60° C. The temperature employed in carrying out the grinding operation can vary depending on the glass transition point of the particular polymer or polymers used. However, such temperatures must be below the lowest glass transition point of the polymer. Any commercial grinders which are capable of producing finely subdivided particles from solids may be used in producing the free flowing, particulate polyolefin material. Examples of suitable grinders include impact mills, rod mills, ball mills, and the like. The particle size of the resulting particulate polyolefin material can be controlled by methods well known in the art such as by varying the grinding speed, controlling the time of grinding, employing a grinding aid, etc. Techniques for cyrogrinding drag reducing particulate polyolefins are disclosed in U.S. Pat. Nos. 4,837,249; 4,826,728; 4,789,383, all of which are incorporated herein by reference. Depending upon the storage, handling and transportation temperatures to which the friction reducing compositions of the present invention are subjected, it may not be necessary, as noted above, to include a coating agent. However, generally speaking a coating agent will be employed and in this regard the present invention contemplates that at least a part of the coating agent may be added as part of the cyrogrinding step. Alternatively, the polymer can be cyroground in the absence of any coating agent and the coating agent and cyroground polymer added separately to the aqueous suspending medium. Thus, for example, cyroground poly alpha olefin friction reducing agent could be added directly to the suspending medium together with wax or some other coating agent. Indeed, it has been found that a stable non-agglomerating composition can be achieved in this manner. However, in the usual case, the cyrogrinding of the polyalphaolefin will occur in the presence of at least a portion of the coating agent, the remainder of the coating agent, if needed, being added to the suspending medium together with the cyroground poly alpha olefin.

Other methods of grinding or forming particulate drag reducing polymer are disclosed in U.S. Pat. Nos. 6,894,088; 6,946,500; 7,271,205, and U.S. Publication 20061 0276566.

The compositions of the present invention can also include emulsifiers although typically emulsifiers are not necessary.

The stable, non-agglomerating compositions of the present invention flow easily and can be readily injected into a pipeline or conduit containing flowing hydrocarbons without any special equipment. Generally, the drag reducing compositions of the present invention can be added to the flowing hydrocarbon fluid by continuous injection by means of proportioning pumps situated at desired locations along the conduit in which the hydrocarbon is flowing.

The hydrocarbon fluids in which friction loss may be reduced by addition of the drag reducing compositions of the present invention include such materials as crude oils, gas oils, diesel oils, fuel oils, refined liquid hydrocarbon stream, asphaltic oils, and the like, varying from materials with relatively low viscosity, pure materials to high viscosity hydrocarbon containing fractions.

The amount of the polyolefin friction-reducing agent used for reducing drag in a pipeline or conduit is usually expressed as pprn (parts by weight of polymer per million parts by weight of hydrocarbon fluid). The amount of a polyolefin friction reducing agent required to produce the desired drag reduction will vary depending upon the physical properties and composition of the hydrocarbon fluid. Thus, the desired result may be obtained by the addition of as little as two pprn or less of the polymer. Conversely, some high viscosity fluids may require as much as 1,000 pprn or even up to 10,000 pprn of the polyolefin friction reducing agent to achieve desired drag reduction. Generally, it is preferred to add the polyolefin friction reducing agent in amounts of from about 2 to about 500 pprn and most preferably amounts from about 1 to about 100 ppm.

Non-limiting examples of drag reducing formulations according to the present invention are given below. Unless otherwise specified all percentages are by weight. All formulations were tested and exhibit excellent drag reduction properties and stability which was determined visually. All formulations were stable and found to be essentially low-foaming. Further, the formulations exhibited good heat stability.

|  | Water | Solids (82% polyolefin, 15% calcium stearate, 3% wax) | Dispersing Agent | Thickening Agent | Biocide |
|---|---|---|---|---|---|
| Formulation 1 | 59.335% | 40.00% | 0500% HYDROPALAT ®-100 | 0.065 Welan Gum | 0.100% 424 AMA-424[1] |

[1]Vinings Industies, Inc.

The above formulation is found to be desirable after being in an oven at 150° F. for four days, i.e., no significant agglomeration was observed. Indeed, even when dispersing agent is presently in amounts of 1%-2%, after heating for 150° F. at four days and although some thickness is observed, upon mild agitation, a uniform dispersion again forms.

The drag reducing compositions of the present invention provide a number of advantages. A particular advantage of the drag reducing compositions of the present invention as mentioned above is the fact that they do not require the presence of an anti-foaming agent, thus reducing their cost. Indeed, it is a feature of the present invention that the drag reducing compositions of the present invention are substantially free of any anti-foaming agent. Additionally, since the drag reducing compositions of the present invention are essentially low foaming, they can be easily shipped, pumped, and injected into pipe lines without undergoing deleterious foaming. Their low-foaming characteristics minimize handling procedures. Additionally, the compositions can easily be injected in the pipeline without any special equipment such as special nozzles or placement of nozzles. The polymer component (including the partitioning agent, e.g. polyolefin wax) of the compositions of the present invention readily dissolve in the flowing hydrocarbon.

The compositions of the present invention can be used with a high loading of the polyolefin friction reducing agent (e.g., polyolefin only) of up to about 45%, more particularly up to abut 41% by weight which is still a stable, free flowing composition. When described in terms of total solids, e.g. polyolefin, partitioning agent, etc., the loading can be up to about 50% by weight. It will be recognized that this high loading substantially reduces transportation costs as the shipping volume of the friction reducing composition is reduced. Further, since the suspending medium is basically water, environmental hazards both in transportation and in use of the composition are greatly reduced.

The foregoing description and examples illustrate selected embodiments of the present invention. In light thereof, variations and modifications will be suggested to one skilled in the art, all of which are in the spirit and purview of this invention.

What is claimed is:
1. An aqueous drag reducing composition comprising:
from about 10%-45% of a finely divided solid polyolefin, friction reducing agent formed from monoolefins containing from 2 to 30 carbon atoms;
0.1-5% by weight of a hydrophobic polyelectrolyte dispersion agent comprising a polycarboxylate having a general formula;

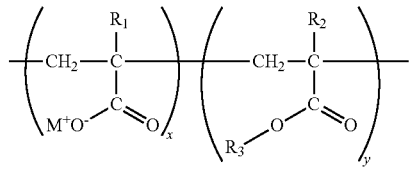

wherein $R_1$ and $R_2$ are independently $H^+$ or methyl,
wherein $R_3$ is an alkyl group having from 1 to 3 carbon atoms,
wherein x and y are integers which can be the same or different, the sum of x and y being from 10 to 700, and
wherein $M^+$ is an ammonium ion; and
an aqueous suspending medium.
2. The composition of claim 1, wherein said friction reducing agent is present in an amount of from about 30-41% by weight.
3. The composition of claim 1, wherein said polyolefin friction reducing agent is produced by a solution polymerization.
4. The composition of claim 1, wherein said polyolefin friction reducing agent is produced by bulk polymerization.
5. The composition of claim 1, further comprising:
from about 0.1-25% by weight of a coating agent.
6. The composition of claim 5, wherein said coating agent comprises a wax.
7. The composition of claim 6, wherein said wax is a hydrocarbon wax.
8. The composition of claim 5, wherein said coating agent comprises a metallic salt of a fatty acid.
9. The composition of claim 1, further comprising:
a freeze point depressant in an amount of between 0 and 20% by weight of the composition.
10. The composition of claim 9, wherein said freeze point depressant is selected from the group consisting of alcohols and glycols containing from 1 to 14 carbon atoms.
11. The composition of claim 1, further comprising:
an effective amount of a biocide.
12. The composition of claim 1, wherein $R_1$ and $R_2$ are hydrogen, M is an ammonium ion, and $R_3$ is methyl.
13. The composition of claim 1, wherein said dispersion agent has a pH of from about 6.0 to about 8.5.
14. A method of reducing drag in a flowing hydrocarbon stream comprising introducing into said stream an effective amount of the drag reducing composition of claim 1.
15. The composition of claim 1, wherein said composition is free of anti-foaming agents.

* * * * *